D. J. BELL.
EXPELLING PIN.
APPLICATION FILED APR. 18, 1919.
1,339,157.
Patented May 4, 1920.
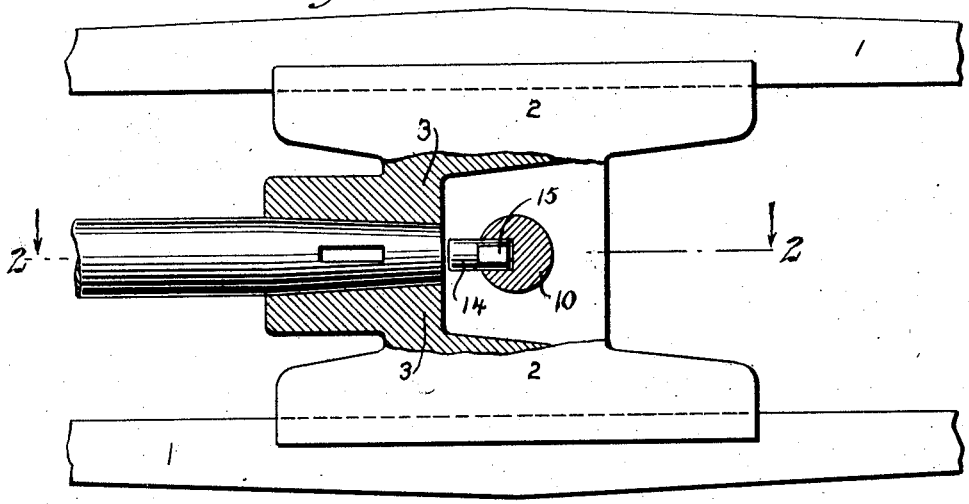
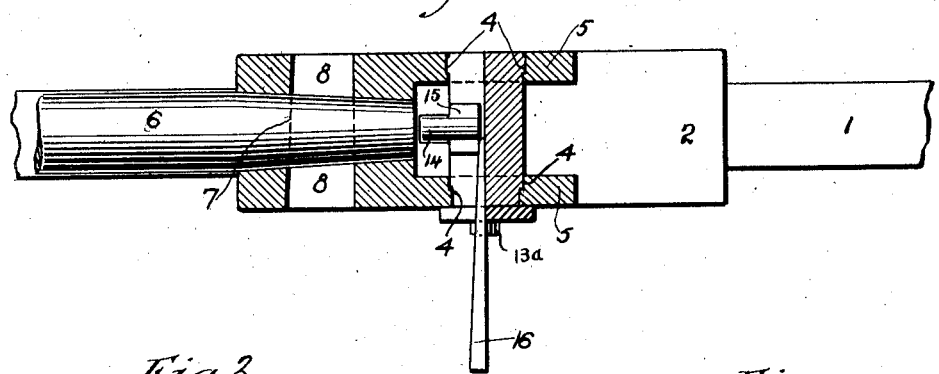
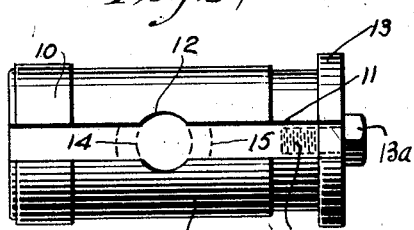
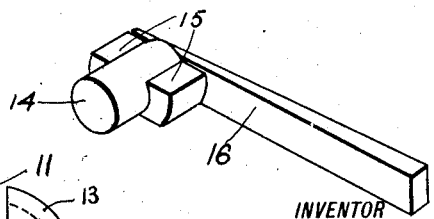
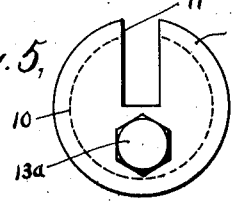
WITNESSES
Edw. Thorpe
J. C. Ledbetter
INVENTOR
D. J. Bell
BY
ATTORNEYS

UNITED STATES PATENT OFFICE.

DANIEL J. BELL, OF SALAMANCA, NEW YORK.

EXPELLING-PIN.

1,339,157.     Specification of Letters Patent.     Patented May 4, 1920.

Application filed April 18, 1919. Serial No. 291,066.

*To all whom it may concern:*

Be it known that I, DANIEL J. BELL, a subject of Great Britain, and a resident of Salamanca, county of Cattaraugus, and State of New York, have invented a new and Improved Expelling-Pin, of which the following is a full, clear, and exact description.

This invention relates to an expelling pin device, and more particularly relates to a tool for removing piston rods from cross-heads of an engine.

An object of the invention is to provide an expelling pin tool which may be used for the purpose of removing the piston rod from its connected position within the cross-head of a locomotive.

A further and other object of my invention is to provide a substantially heavy pin fitted with an expeller key, which pin may be inserted in the wrist pin bearing of a cross-head and operated to drive the piston rod from its seated position in said cross-head. Features of the invention reside in certain means and certain designed form of an expelling device as described.

With the above principal objects in view, the invention has relation to a certain combination and arrangement of parts, an example of which is described in the following specification, pointed out in the appended claims and illustrated in the accompanying drawings, wherein:

Figure 1 shows a piston rod and cross-head assembly carried within guides, this view being illustrative of locomotive parts.

Fig. 2 shows a sectional view taken upon the line 2—2 of Fig. 1.

Fig. 3 illustrates a certain form of insert pin, shown in side elevation.

Fig. 4 illustrates a coöperating expelling key and driving wedge used to force a piston rod from its set position in a cross-head.

Fig. 5 shows an end view of the insert pin provided with a removable head flange and retaining cap screw.

Referring more particularly to the drawings, the numeral 1 points out the spaced parallel guide members of a locomotive or other engine or machine. A cross-head is slidably confined within the guide members, said cross-head comprising a pair of slide blocks 2 adapted to reciprocate upon the guides and integrally formed with the central hub block 3. The hub block is provided with the usual wrist pin bore 4 which receives the wrist pin for pivotally connecting the cross-head with the connecting rod. The connecting rod is omitted from the drawings, likewise the wrist pin is omitted from the drawings. The bore 4 is provided in webs 5 integrally formed with the hub block. The piston rod 6 is inserted in the hub block and confined therein by passing the key, not shown, through a key-way 7 formed through the tapered end of the piston rod and fitting into a key-way 8 formed in the hub block, and registering with the key-way 7 of the piston rod. The piston rod 6 is assembled with the cross-head under great pressure and a key passed through the registering slots 7 and 8. This construction makes it quite difficult at times to remove the piston rod from the cross-head, and my invention relates to specific means and tools for removal of this piston rod from its set position within the cross-head of a locomotive or other machine.

My invention essentially comprises a form of insert pin coöperating with an expeller key and driving wedge. The insert pin is illustrated in Fig. 3 as separate from any application with the cross-head assembly, and comprises a substantially cylindrical pin 10 having about the same diameter as the bore 4, or in other words, having about the same diameter as a wrist pin which is removable from the bore 4. This insert pin is grooved at 11, and shows the groove or channel 11 to be cut in the face of said pin parallel to its axis. The depth of the groove will preferably be about one-half the diameter of the pin, or of any appropriate dimension. The groove may be provided with a bore 12, which bore will preferably be a little more in diameter than the width of the groove. A head or flange 13 is secured upon the insert pin by a cap screw 13ª.

An expelling key comprising a cylindrical hardened steel member 14 integrally formed with a guiding key 15 is employed for use in connection with the insert pin. The expelling key is adapted to be placed in position with the insert pin as shown by the dotted line position in Fig. 3. The expelling pin is adapted to undergo a sliding motion along the bore 12 guided by the keys 15.

A driving wedge comprising a hardened steel wedge member 16 is employed for imparting movement to the expelling key relative to the insert pin.

To remove a piston rod 6 from the crosshead with this apparatus, I first knock the piston rod key from its position 7—8. The wrist pin is next removed from the crosshead and the connecting rod freed from its bearing. This allows the cross-head to be slid forward free from the connecting rod.

The insert pin is then placed in position as shown in Figs. 1 and 2. The pin may be rotated until the expelling key can be inserted, after which the insert pin and associate expelling key will be turned back until the expelling key points toward the adjacent exposed end of the piston rod. The driving wedge will then be passed into the slot 11 and behind the expelling key. This tightens the expelling key against the end of the piston rod, with the wedge between the insert pin and the back edge of the expelling key. By vigorously hammering on the wedge the expelling key is forced under great pressure against the end of the piston rod thus forcing the tapered piston rod from its position in the bore of the crosshead. By hammering on the wedge and at the same time tapping on the piston rod or adjacent parts, said rod can always be removed by proper application and use of this device.

Piston rods which have been set into cross-heads under great pressure may be removed by using this expeller device as described.

Having thus described my invention, what I desire to claim, and secure by Letters Patent is:

1. An expelling pin capable of removing piston rods from cross heads comprising in combination, an insert pin provided with a channel extending the full length of the pin and a bore formed in the channel, an expelling key adapted to be confined in the bore and channel of the insert pin, and means inserted in the channel for exerting pressure against the expelling key for forcefully engaging the piston rod to be removed.

2. An expelling device adapted to be inserted in a cross head bearing and engage the piston rod fixed within the cross head for expelling said piston rod therefrom, comprising in combination; an insert pin having substantially the same diameter as the bearing formed in the cross head and provided with a channel extending the length of the pin, an expelling pin movably confined within the channel, and a driving wedge adapted to be inserted within the channel of the insert pin and between the insert pin and expelling key for exerting pressure against said expelling key to engage the piston rod.

3. An expelling device to remove machine elements from fixed position, comprising in combination: a cylindrical insert pin provided with a groove parallel with axis of said pin and provided with a bore through the groove transverse to the axis of said insert pin, an expelling key inserted in the bore, and a wedge inserted in the groove behind the expelling key to force the expelling key against the machine element to be removed.

4. An expelling pin device to remove machine elements from fixed position comprising in combination: a cylindrical insert pin having a groove parallel to the axis of said pin, said insert pin having a bore made in the groove transverse to the axis of the pin, an expelling key confined in the bore, guiding keys or wings integrally formed with the expelling pin and confined in the groove, and a driving wedge employed to slide through the groove under the expelling key and guiding keys for the purpose of forcing the expelling key against a machine element to be removed from fixed position.

DANIEL J. BELL.